(12) United States Patent
Suzuki et al.

(10) Patent No.: US 6,570,580 B1
(45) Date of Patent: May 27, 2003

(54) APPARATUS AND METHOD FOR INFORMATION DISPLAY

(75) Inventors: Hitoshi Suzuki, Ebina (JP); Naohisa Koizumi, Ebina (JP); Goro Ohnishi, Yokohama (JP); Tomohisa Kohiyama, Yokohama (JP); Kazushi Kobayashi, Ebina (JP); Takeshi Igarashi, Ayase (JP); Hironori Oikawa, Hadano (JP); Hiroyuki Mano, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/440,286

(22) Filed: Nov. 15, 1999

(30) Foreign Application Priority Data

Nov. 13, 1998 (JP) ............................................ 10-323764

(51) Int. Cl.[7] ................................................. G09G 5/24
(52) U.S. Cl. ........................ 345/629; 345/784; 345/804; 345/963
(58) Field of Search ................................ 345/141, 112, 345/192, 467, 468, 469.1, 470, 471, 864, 204, 786, 784, 804, 721, 821, 823, 776, 775, 963, 629; 705/9, 11, 7, 8; 368/8, 21, 28, 22–24, 46, 62, 71, 89

(56) References Cited

U.S. PATENT DOCUMENTS 5,860,067 A * 1/1999 Onda et al. ................... 705/9
5,877,760 A * 3/1999 Onda et al. ................. 345/784
5,948,040 A * 9/1999 DeLorme et al. ........... 701/201
6,040,829 A * 3/2000 Croy et al. .................. 345/864
6,166,728 A * 12/2000 Haman et al. .............. 345/719

FOREIGN PATENT DOCUMENTS

JP 9244600 9/1997

\* cited by examiner

Primary Examiner—Jeffery Brier
Assistant Examiner—Thu Thao Havan
(74) Attorney, Agent, or Firm—Antonelli, Terry, Stout & Kraus, LLP

(57) ABSTRACT

An apparatus for information display for displaying not only periodic information in accordance with schedule, but also non-periodic information regardless of the schedule, to passengers and passersby in stations, airports, harbors, bus terminals and streets, and the like. The apparatus comprises an information-storing section for storing a plurality of non-periodic information to be displayed regardless of the schedule, an input circuit for receiving a plurality of input signals transmitted from an external device or a remote place and display control section for simultaneously displaying the non-periodic information and periodic information which correspond to the kind of an input signal, when the apparatus receives this input signal from the external apparatus or the remote place. The apparatus may be a multi-screen display type having a plurality of screens. In this case, a combined screen data consisting of a non-periodic information and a periodic information can be displayed, or the non-periodic information or the periodic information can be displayed, on at least one of the screens.

20 Claims, 10 Drawing Sheets

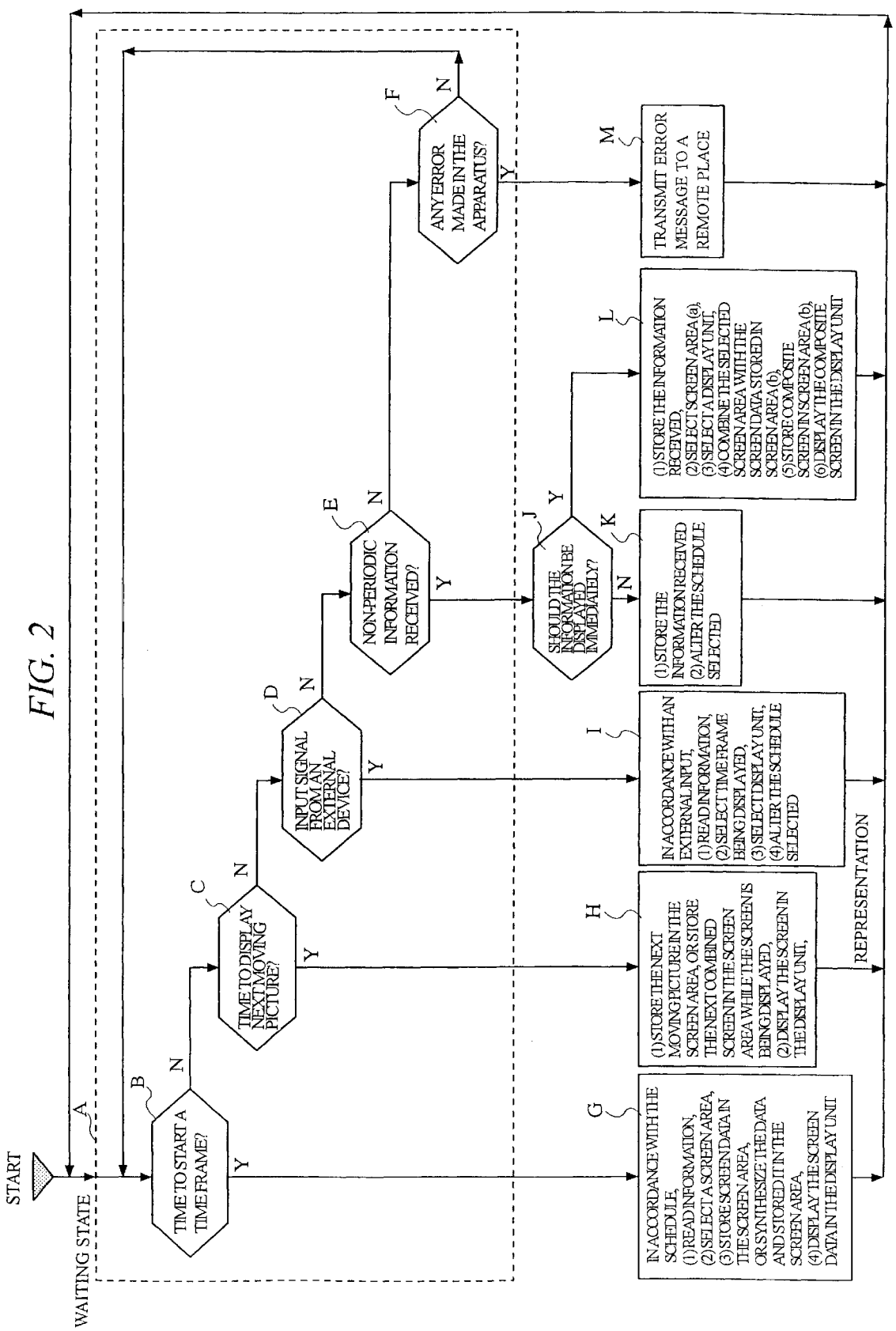

AN EXAMPLE OF OPERATION OF AN EXTERNAL INPUT (FIG. 3A)

APPARATUS AND METHOD FOR INFORMATION DISPLAY

BACKGROUND OF THE INVENTION

The present invention relates to a technique of displaying information, particularly to an apparatus for information display to passengers and passersby in stations, airports, harbors, bus terminals, buildings and streets, and the like. More particularly, the invention relates to a technique which is useful and efficient when applied to display apparatuses and the like that can display non-reservation information alone in one screen, or reservation-based information and non-reservation information together in one screen.

There is information, such as advertisement, that should be displayed in time frame by some of the display devices installed in the stations and streets, said time frames and said display devices having been designated in schedule. There is other information that should be displayed for convenience and safety for the passengers and passersby. Such information is, for example, the messages of "The train is coming into the track" and "The train is now overdue" made in the stations. On the streets, such information may be special newscasts and the like.

Hitherto, display devices for displaying information, such as static pictures, moving pictures and the like, in desired time frame have been of the type that sequentially reproduces items of information recorded on, for example, video tape. These display devices are technically disadvantageous, because they cannot display information not designated in the schedule or display data in any order changed.

As disclosed in Japanese Patent Application Laid-Open No. 9-244600, a display device is known that displays recorded information reproduced from a video tape and then stored into a data storage section such as a server, in the time frame designated in schedule. However, this display device has no means for detecting any information which is other than the information designated in the schedule and which should yet be displayed. Nor is this display apparatus designed to display any data items other than those designated in the reservation schedule.

An object of the present invention is to provide an information-displaying technique that can display various types of information in various modes whether the information is designated by schedule or not.

SUMMARY OF THE INVENTION

An apparatus for information display according to the present invention comprises information-storing section for storing a plurality of various data that do not accord with schedule, an input circuit for receiving a plurality of input signals from an external device or a remote place, and a display control means for displaying the data corresponding to the kind of the input signal, prior to any data that accords with the schedule when an input signal is received from the external devices or the remote places. Thus, the apparatus for information display can display data generated of the schedule, such as a message "The train is coming into the track" corresponding to an input signal generated in any external devices (e.g., a train service control device) or "a special newscast" corresponding to an input signal received through a transmitting/receiving circuit.

The apparatus for information display comprises display control means designed not to cancel, interrupt or inhibit the displaying of data that accord with the schedule, when data that do not accord to the schedule are displayed prior to the data that accord with the schedule. The display control means perform the following functions.

The apparatus for information display comprises screen-combining means for combining data to be displayed in accordance with the schedule, together with data to be displayed regardless of the schedule. In this case, the display control means cause the screen-combining means to combine these data, thereby to display one combined screen data consisting of these data. Thus, the data that do not according with the schedule can be displayed on the same display unit, without interrupting the displaying of the data that accord with the schedule.

The display control means can start the displaying of the data that do not accord with the schedule, at a timing of switching the data that accord the schedule, when an input signal is received from the external device or the remote place. Hence, the data that do not accord with the schedule can be displayed, without interrupting the displaying of the data that accord with the schedule.

The apparatus for information display may be a multi-screen apparatus having a plurality of independent screens. In this case, the display control means display data that do not accord with the schedule on one or more screens, without jeopardizing the displaying on the other screens.

Moreover, the display control means perform some additional functions, not to jeopardize the displaying of data not according with the schedule or the displaying of data according to the schedule, if new data to be displayed have been generated regardless of the schedule.

First, when a new signal is received from an external device or a remote place while data that accord with the schedule are being displayed, the display control means compare, in the precedence, the data being displayed with the data corresponding to the input signal. If the priority of the data being displayed is higher, the display control means start the displaying of the data corresponding to the input signal after the data have been completely displayed. If the priority of the data being displayed is lower, the display control means immediately start the displaying of the data corresponding to the input signal.

Secondly, if the apparatus for information display has a plurality of screens for displaying a plurality of independent screen data at the same time, a new signal may be received from an external device or a remote place while data that do not accord with the schedule are being displayed on one or more of the screens. In this case, the display control means display the data corresponding to the input signal on one or more screens which are displaying data that accords with the schedule.

BRIEF DESCRIPTION OF THE DRAWINGS

FIG. 2 is a flow chart explaining the operation of the control circuit provided in the apparatus for information display according to an embodiment of the invention;

DESCRIPTION OF THE PREFERRED EMBODIMENTS

Embodiments of the present invention will be described, with reference to the accompanying drawings.

Figure 1:
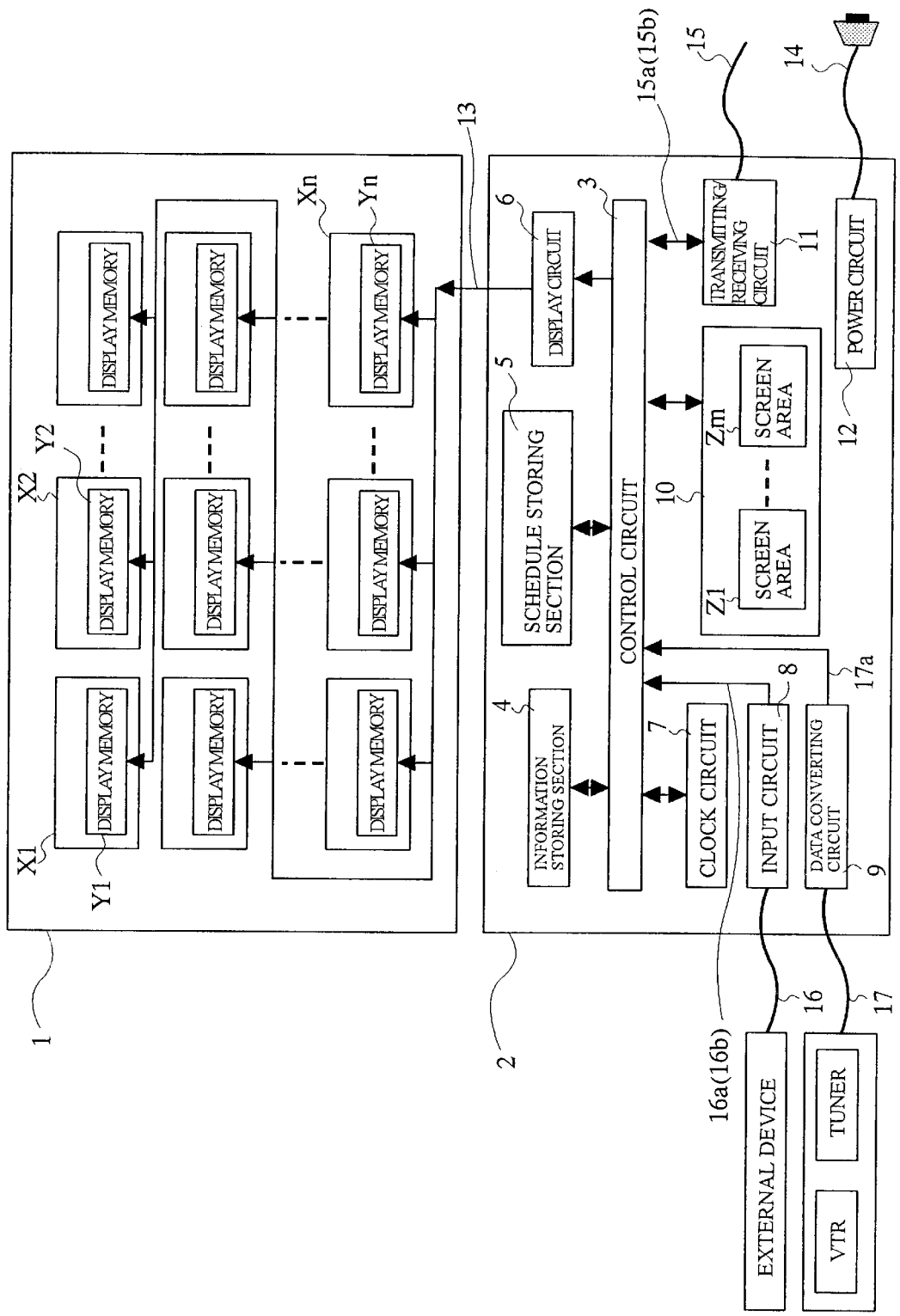
FIG. 1 is a schematic representation of an apparatus for information display according to an embodiment of the present invention.

FIG. 1 is a schematic representation of an apparatus for information display according to an embodiment of the invention.

A display device 1 of an apparatus for displaying information comprises n orderly arranged display units X1 to Xn. The units X1 to Xn have display memories Y1 to Yn, respectively. The memories store screen data of digital information to be displayed by the units. Unless each date content of the memories is sequentially updated, each display unit of the units X1 to Xn keeps the same picture and thereafter becomes a static picture. If each date content of the memories is sequentially updated, for example, 30 times a second, each display unit of the units X1 to Xn shows a moving picture.

The units X1 to Xn are connected to a display circuit 6 of a control device 2 by an interface line 13. The interface line 13 transmits undated data to each of the units X1 to Xn because of updating the memories Y1 to Yn. The updated data consist of a display-unit number, RGB data (representing the color components of red, green, and blue of dots forming a screen), a horizontal synchronizing signal, a vertical synchronizing signal, and the like. The interface line 13 can be realized by using all purpose interface, such as an analog RGB interface, a digital RGB interface, or a USB (Universal Series Bus) interface.

In a case of using an analog RGB interface, the RGB data, horizontal synchronizing signal, and vertical synchronizing signal corresponding to an imaginary large screen that is composed of all screens of the units X1 to Xn are transmitted to all the units X1 to Xn. Screen data corresponding to the parts of the imaginary large screen are thereby taken in the units X1 to Xn. Hence, the data are updated in each of the display memories Y1 to Yn corresponding to each of the units X1 to Xn. This holds true for a case of using the digital RGB interface.

In a case of using the USB interface, the display-unit members and RGB data corresponding thereto are transmitted to each of the units X1 to Xn. The members Y1 to Yn are updated because the units X1 to Xn corresponding to the members take in the RGB data.

Further, in a case of using both of the analog RGB interface and the USB interface, the numbers are transmitted to the display device 1 through the latter interface, thus selecting the units X1 to Xn. And the RGB data are transmitted to the display device 1 through the former interface, whereby the data are updated in the memories Y1 to Yn incorporated.

The control device 2 comprises a control circuit 3, an information-storing section 4, a schedule storing section 5, a display circuit 6, a clock circuit 7, an input circuit 8, a data converting circuit 9, a screen-data storing section 10, a transmitting/receiving circuit 11, and a power circuit 12. The control circuit 3 controls operation of displaying information in the apparatus for information display according to an embodiment of the invention. The information-storing section 4 stores information for representing static pictures and moving pictures. The schedule storing section 5 stores a timetable which shows data and time frames to be displayed on the units X1 to Xn, or determination of compound operation thereof. The display circuit 6 transmits screen data to each of the units X1 to Xn through the interface line 13. The clock circuit 7 holds information showing the date and time. The input circuit 8 receives an external input signal 16a with non-periodic display information 16b or information for indicating output timing and assigned priorities of the non-periodic information 16b. The non-periodic information 16b is information of "The train is coming into the truck" from an external device through an input signal line 16. The date converting circuit 9 receives a periodic display information 17a and changes the periodic information 17a into a digital information. The periodic information 17a is a picture signal transmitted from an external video recorder (VTR) or a tuner circuit through a picture signal line 17. The screen-data storing section 10 stores a plurality of screen data. The transmitting/receiving circuit 11 transmits and receives an input/output signal 15a containing a non-periodic display information 15b, a message and the like, from and to a remote place through a communication line 15. The power circuit 12 supplies a DC current and the like to the other components of the control device 2 through a power line 14. The screen-data storing section 10 has m screen areas Z1 to Zm for storing screen data.

The control circuit 3 and the other circuits incorporated in the control device 2 can be realized by using electronic circuits, program control circuits having a microcomputer, semiconductor memories, and electronic parts.

Figure 5:
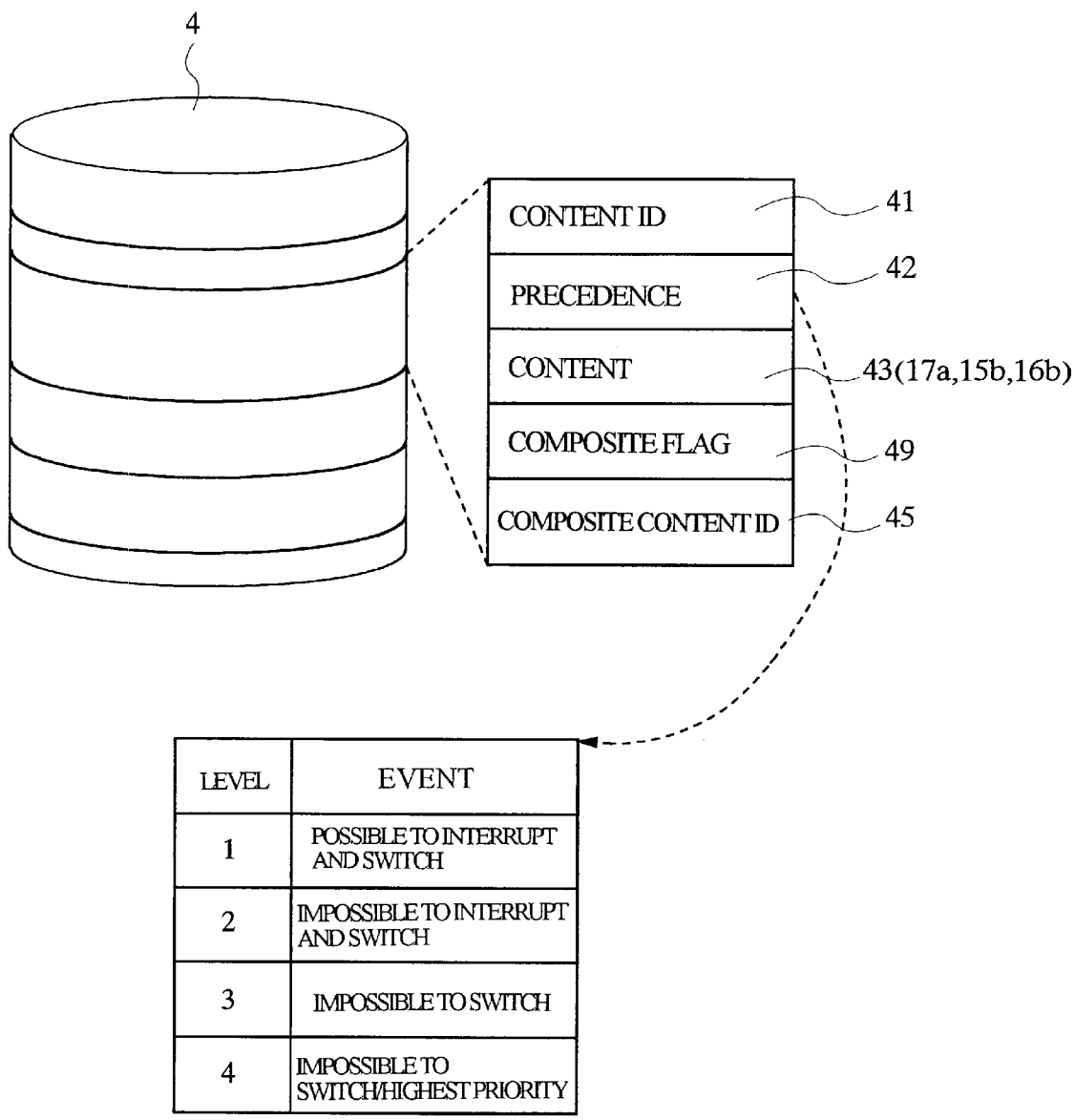
FIG. 5 is a diagram schematically depicting the format of storing information in the information-storing section of the apparatus for information display according to an embodiment of the invention.

The information-storing section 4 stores information content such as non-periodic information 16b, the periodic information 17a, the non-periodic display information 15b, and the like, in a format as shown in FIG. 5.

That is, the content includes a content ID 41, a precedence 42, a content 43, composite flags 44, and a composite content ID 45. The content ID 41 distinguishes individual information. The precedence 42 represents priority order for disposing of display information. The content 43 comprises the non-periodic information 16b, the periodic information 17a, the non-periodic information 15b, and the like. Each of the composite flags 44 indicates composite method (registration, vertical or horizontal division of the display screen, ratio of dividing the display screen, and the like) and determination of making the given display information synthetic. The composite content ID 45 indicates content as composite object in the storing section 4. The precedence 42 can be set from lower level 1 to higher level 4 in priority order.

Figure 6:
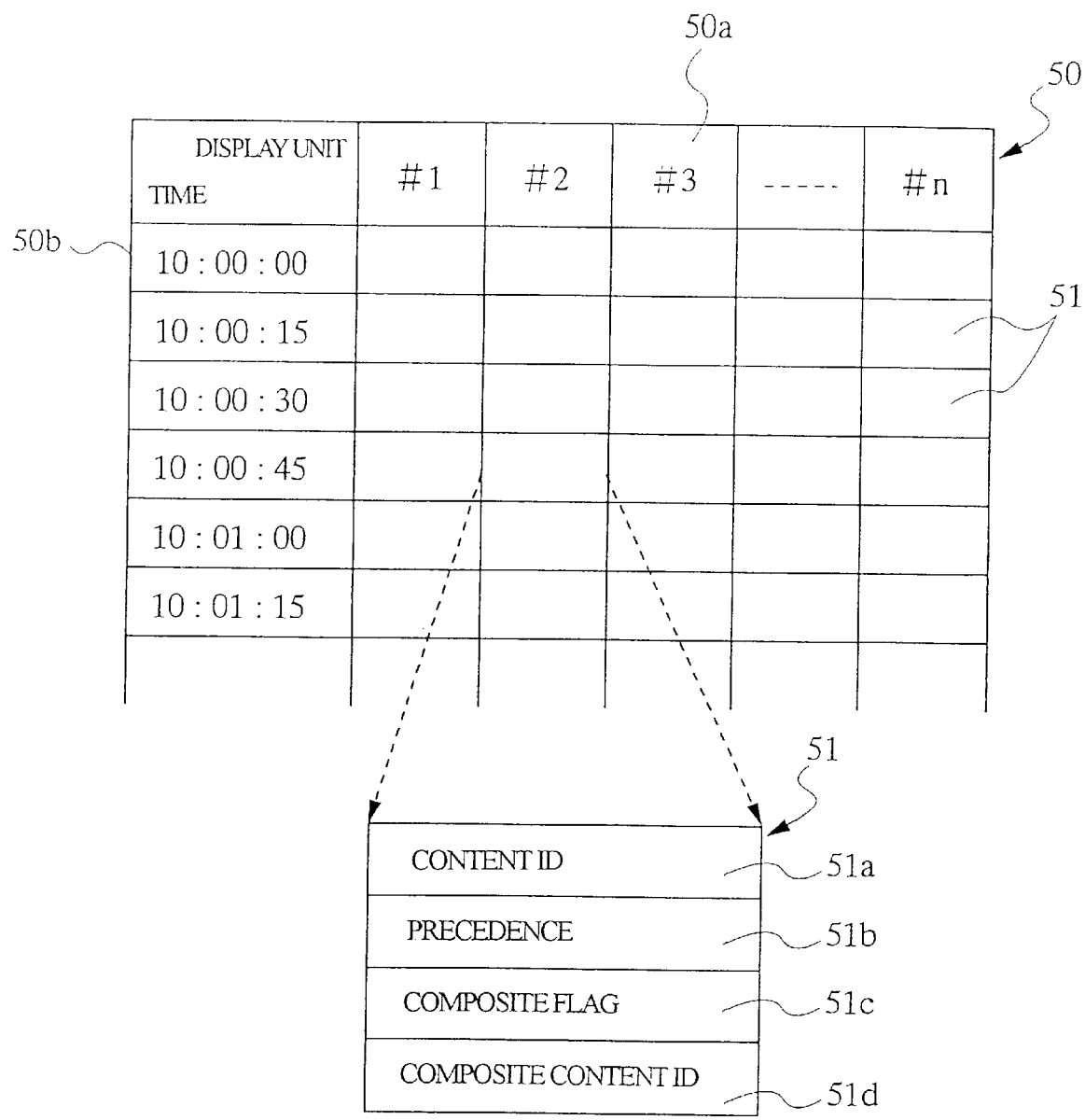
FIG. 6 is a table illustrating schedule used in a modification of the apparatus for information display according to an embodiment of the invention.

A timetable 50 taken in the schedule storing section 5 has, for example, a structure as shown in FIG. 6. That is, the timetable 50 has a display-device number 50a in a row corresponding to the units X1 to Xn, and a time frame 50b set at a prescribed regular interval (every 15 seconds in the example of FIG. 6), in a column. Each of entries 51 in the timetable 50 contains information comprising a content ID 51a, a precedence 51b, a composite flag 51c, a composite content ID 51d, and the like. The content ID 51a indicates content to be displayed at the time frame by the display device 1. The precedence 51b represents the priority order of the content.

The operation of the apparatus for information display shown in FIG. 1 will now be described. FIG. 2 is a flow chart explaining how the control circuit 3 operates. FIGS. 3A to 3D show example screens displayed by using the present invention.

Main information (content) to be displayed and the timetable 50 are stored into the information and schedule storing section 4, 5 through the data converting circuit 9 and transmitting/receiving circuit 11, and are used to operate the control circuit 3 shown in FIG. 2.

The operation of the control circuit 3 will be explained, with reference to the flow chart of FIG. 2.

When started, the control circuit 3 is set in a waiting state at step A. In the waiting state, the control circuit 3 repeats operation determined by steps B, C, D, E and F, thereby waiting for one step thereof to occur.

In step B, the control circuit 3 refers to the timetable 50 and present time measured by the clock circuit 7, and determines whether or not the present time is within starting time of the time frame 50b in the timetable 50. If NO in step B, that is, if the present time is time to start displaying the periodic information 17a in accordance with the timetable 50, the flow goes to step C. If YES in step B, that is, if the present time is time to start displaying the periodic information 17a, the flow goes to step G. In step G, in accordance with information contained in the corresponding entry 51 in the timetable 50, the control circuit 3 (1) reads the periodic information 17a from the information section 4, (2) selects a screen area of the screen-data section 10, (3) stores the screen data in each of the screen areas Z1 to Zm, and (4) transmits the screen data to each of the units X1 to Xn, thereby displaying the screen data.

Thereafter, the control circuit 3 is brought back into the waiting state again. If the corresponding periodic information 17a represents a static picture, the screen data represent one picture and remain the static picture until a next time frame 50b starts.

If the periodic information 17a represents a moving picture, the screen data are divided in a plurality of data items. The data items are sequentially transmitted to the units X1 to Xn at regular intervals (e.g., every 1/30 second), and therefore are displayed thereon. Thus, in step C, the control circuit 3 refers to time measured by the clock circuit 7, thereby determining whether or not the present time is time to display a next time frame of the moving picture. If NO in step C, the flow goes to step D. If YES in step C, the flow goes to step H. In step H, the control circuit 3 (1) stores the screen data of the next time frame, in the screen area, (2) transmits the screen data to the units X1 to Xn, thereby displaying the screen data.

Thereafter, the control circuit 3 is brought back into the waiting state again. Then, the sequence of these steps is repeated until the next time frame 50b starts. The moving picture is thereby displayed by the corresponding units X1 to Xn.

Thus, it is possible to display the periodic information 17a which is either a static picture or a moving picture, in accordance with the schedule.

In step D, the control circuit 3 determines whether or not the input circuit 8 has received the external input signal 16a transmitted from the external apparatus. If NO in step D, the flow goes to step E. If YES in step D, the flow goes to step I. In step I, the control circuit 3 (1) reads in the non-periodic information h6b corresponding to the signal 16a and stored in the storing section 4 in advance, (2) refers to the present time measured by the clock circuit 7 and to the timetable 50, thereby selecting the time frame 50b in accordance with the first schedule set at that time, (3) selects the unit (unit number 50a) set in advance, and (4) alters content of the entry 51 in the timetable 50, thereby changing the information to be displayed in the time frame 50b selected, from the periodic information ha in accordance with the schedule to the non-periodic information 16b corresponding to the input signal 16a. Thereafter, the control circuit 3 is brought back into the waiting state. In step B, at starting time in a next time frame 50b selected, the flow goes to step G through step B. In step G, the control circuit 3 works in accordance with the timetable 50 that has been altered in step I. That is, the control circuit 3 (1) takes out the non-periodic information 16b corresponding to the external input signal 16a, such as the message "The train is coming into the track," from the information storing section 4, (2) selects the screen area, (3) stores the screen data of the non-periodic information 16b corresponding to the external input signal 16a, in the screen area selected, and (4) transmits the screen data to the corresponding display unit X1 or Xn, thereby displaying the screen data.

Thus, the periodic information 17a can be switched to the non-periodic information 16b corresponding to the external input signal 16a without inerruption on switching way. The periodic information 17a depends on the timetable 50 in the corresponding to display unit.

Figure 3A:
FIG. 3A is a diagram showing a screen displaying the information represented by an external input signal to the apparatus for information display according to an embodiment of the invention.
Figure 7:
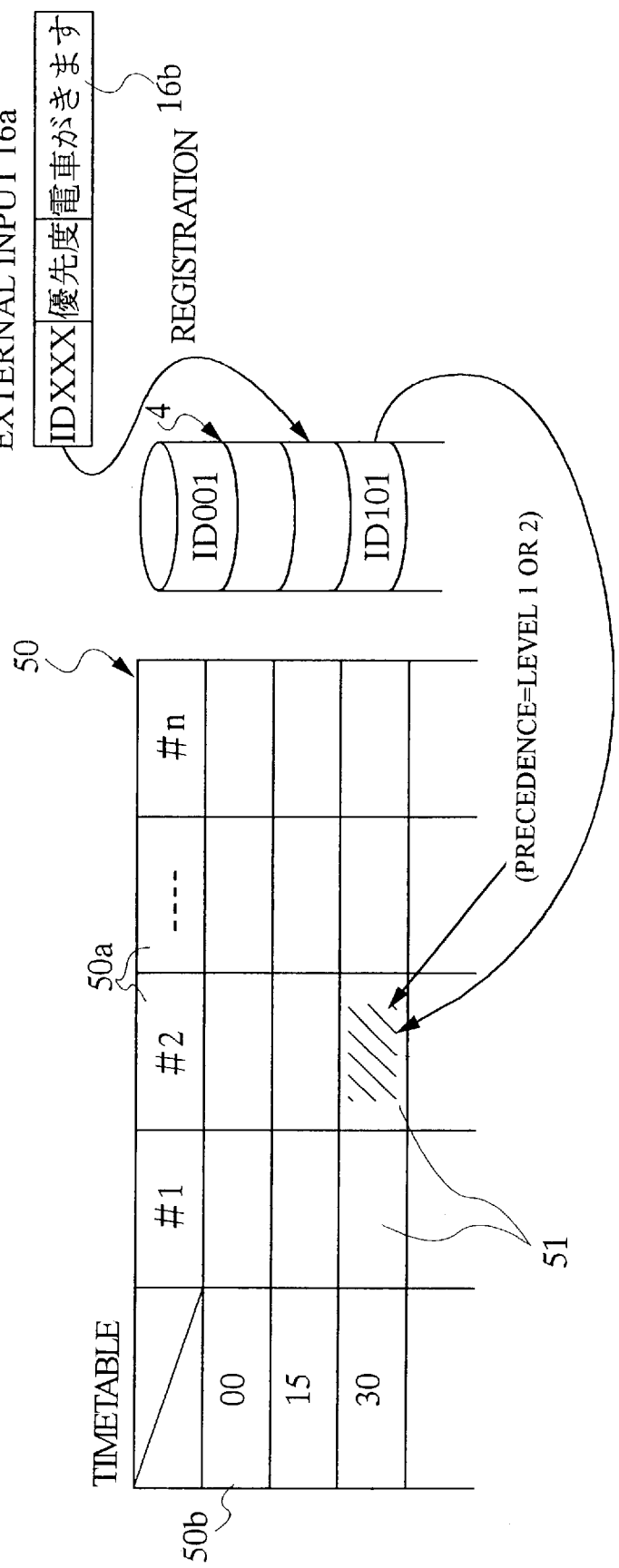
FIG. 7 is a schematic representation of a control mode of the apparatus for information display according to an embodiment of the invention.

FIG. 3A and FIG. 7 show an example described above.

FIG. 3A shows an example in a state that the periodic information 17a in a display screen has already replaced by the displayed non-periodic information 16b corresponding to the input signal 16a. The periodic information 17a corresponds to the previously displayed timetable 50. In this case, if only one display unit has been selected as the above-mentioned units X1 to Xn as shown in FIG. 1, the displaying of the periodic information 17a depending on the timetable 50 in remainder of the units will not be influenced by the selected one.

FIG. 7 is a diagram representing a control mode of updating the timetable 50 by the above-mentioned steps. The storing section 4 stores content of the non-periodic information 16b that corresponds to the external input signal 16a. Wherein, assume that the content of the non-periodic information 16b is level 3 of precedence and means a content ID 101 that represents a character row of "The train is coming into the track." As indicated above, contents of the entry 51 selected are altered when the entry 51 has level 1 or 2 of precedence.

A new external input signal 16a' may be detected when the display unit X1 . . . Xn displays the non-periodic information 16b corresponding to the already transmitted external input signal 16a. If so, the control circuit 3 (1) reads the non-periodic information 16b' which corresponds to the external input signal 16a' and is stored in the information-storing section 4, (2) refers to the timetable 50 and the present time measured by the clock circuit 7, thereby selecting the time frame 50b that accords with the first timetable on the basis of the present time, (3) selects another display unit because the timetable 50 has already been altered so as to cause the display unit to display the non-periodic information 16b corresponding to another external input signal 16a in the previously set units, (4) alters the timetable 50 again, thereby changing the information to be displayed in the selected time frame 50b, from the periodic information 17a that accords with the other schedule, to the non-periodic information 16b' that corresponds to the new external input signal 16a'.

Thus, the non-periodic information 16b corresponding to the external input signal 16a once received can be displayed without influence from the new external input signal 16a'.

Thereafter, in step E, the control circuit 3 determines whether or not the transmitting/receiving circuit 11 has received the non-periodic information 15b, such as a special newscast. If the transmitting/receiving circuit 11 has not received, the flow goes step F. If the transmitting/receiving circuit 11 has received, the flow goes to step J. In step J, the control circuit 3 determines whether the non-periodic information 15b should be displayed immediately or not. If the non-periodic information 15b needs to be displayed at once, the flow goes to step L. Otherwise, the flow goes to step K.

Figure 3B:
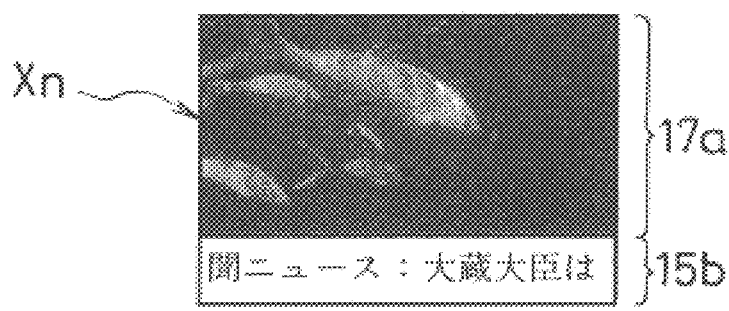
FIG. 3B is a diagram depicting a screen displaying a special newscast, along with other information, in the apparatus for information display according to an embodiment of the invention.
Figure 8:
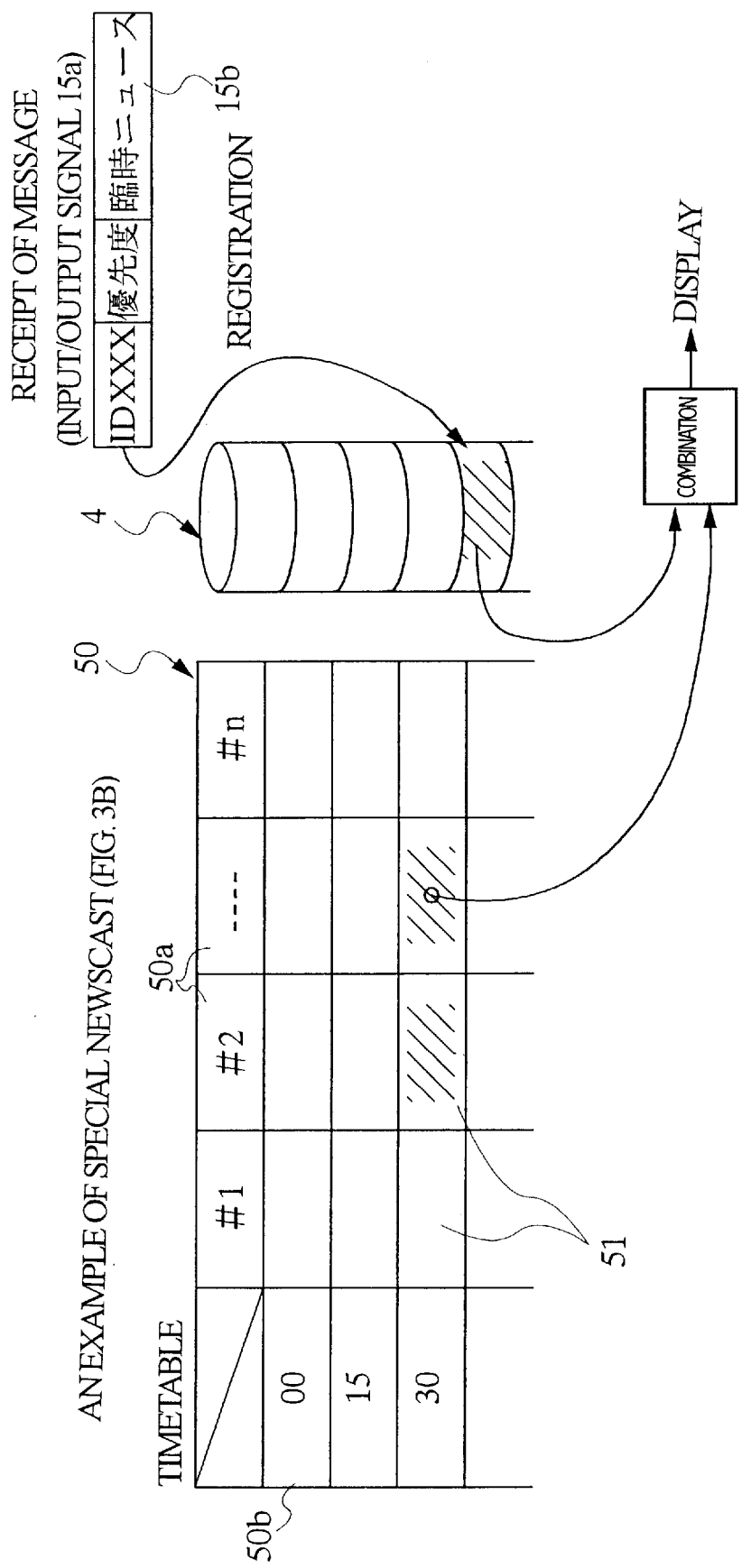
FIG. 8 is a diagram illustrating another control mode of the apparatus for information display according to an embodiment of the invention.

FIG. 3B and FIG. 8 show an example displayed by the periodic information 17a combined with "special newscast" immediately (the non-periodic information 15b). "Special newscast" is contained in the input signal 15a that has been received by the transmitting/receiving circuit 11. How the special newscast is so displayed will be explained below.

In step E shown in FIG. 2, when detecting the receipt of the special newscast (non-periodic information 15b) at the transmitting/receiving circuit 11, the control circuit 3 determines that the non-periodic information 15b should be displayed in step J immediately, and then executes step L. That is, the control circuit 3 (1) stores "special newscast" (non-periodic information 15b) in the information-storing section 4, (2) selects the screen area (a) that stores the screen data representing a motion picture in which "special newscast" (non-periodic information 15b) will be displayed, (3) selects the display unit that displays "special newscast" (non-periodic information 15b) after being combined thereby, (4) combines the screen of "special newscast" (non-periodic information 15b), with the screen data stored in the screen area (b) which is being displayed by the selected display unit, (5) stores the composite screen data in the screen area (b), and (6) transmits the combined screen data to the selected display unit, thereby displaying the composite screen data. Then, the control circuit 3 is brought back into the waiting state.

In this case, since "special newscast" (non-periodic information 15b) is a moving picture, the composite screen data must sequentially be transmitted to the display unit at regular intervals (e.g., every 1/30 second). Thus, the composite screen data are handled in the same way as that of the moving picture described above. That is, in step C, the control circuit 3 refers to time measured by the clock circuit 7, thereby determining whether or not the time has come to display the next time frame of the moving picture. If YES, the control circuit 3 performs step H. In step H, the control circuit 3 (1) stores the screen data for the next frame, in the screen area (b), (2) transmits the composite screen data to the display unit, thereby displaying the composite screen data. Thereafter, the control circuit 3 return the waiting state. Then, the control circuit 3 sequentially repeats these steps until "special newscast" (non-periodic information 15b) ends. Therefore, the selected display unit can display the moving picture combined with "special newscast" (non-periodic information 15b).

Thus, "special newscast" (non-periodic information 15b) received via the transmitting/receiving circuit 11 can be displayed at once while the periodic information 17a is displayed in accordance with the timetable 50. Although not shown in FIG. 2, in the same way, while the periodic information 17a is displayed in accordance with the timetable 50, the non-periodic 16b that corresponds to the external input signal 16a received via the input circuit 8 can be immediately displayed.

FIG. 8 is a diagram illustrating a control mode of updating the timetable 50 by performing the above-mentioned steps. The information-storing section 4 stores the content of the non-periodic information 15b that corresponds to the message (the input signal 15a). Assume that the content of the non-periodic information 15b represents a moving picture of "special newscast". The content of the non-information 15b is combined with the screen data corresponding to the entry 51 selected in the timetable 50 and thereafter is displayed.

Without combining the screen data described above, the displaying data on the display unit may be interrupted, and the display unit may immediately display either the non-periodic information 15b received via the transmitting/receiving circuit 11 or the non-periodic information 16b corresponding to the external input signal 16a received via the input circuit 8. That is, the data displayed by the selected display unit may not be, for example, the periodic information 17a that accords with the timetable 50, but may be either the non-periodic information 15b that has been received via the transmitting/receiving circuit 11, or the non-periodic information 16b' that corresponds to another external input signal 16a' received via the input circuit 8. In this case, both of the non-periodic information 15b, 16b' which are compared with the non-periodic information 16b to be displayed immediately, in order of precedent. If the latter non-periodic information 16b has higher priority, the displaying of the former non-periodic information 15, 16b' are interrupted, and the displaying is switched to the latter non-periodic information 16b at once. Conversely, if the latter non-periodic 16b has lower priority, the displaying is switched to new non-periodic information 16b after the displaying of the former 15b, 16b' has been finished.

Figure 3C:
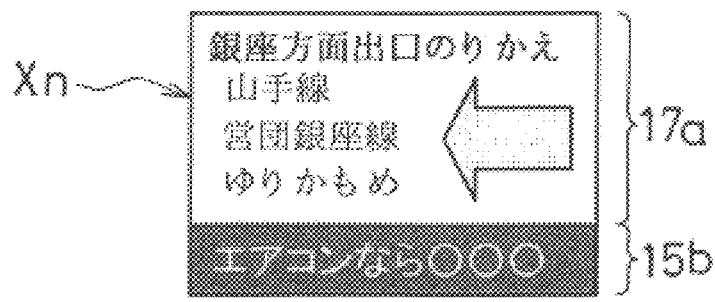
FIG. 3C is a diagram illustrating a screen displaying a special advertisement, along with a periodic guidance, in the apparatus for information display according to an embodiment of the invention.
Figure 9:
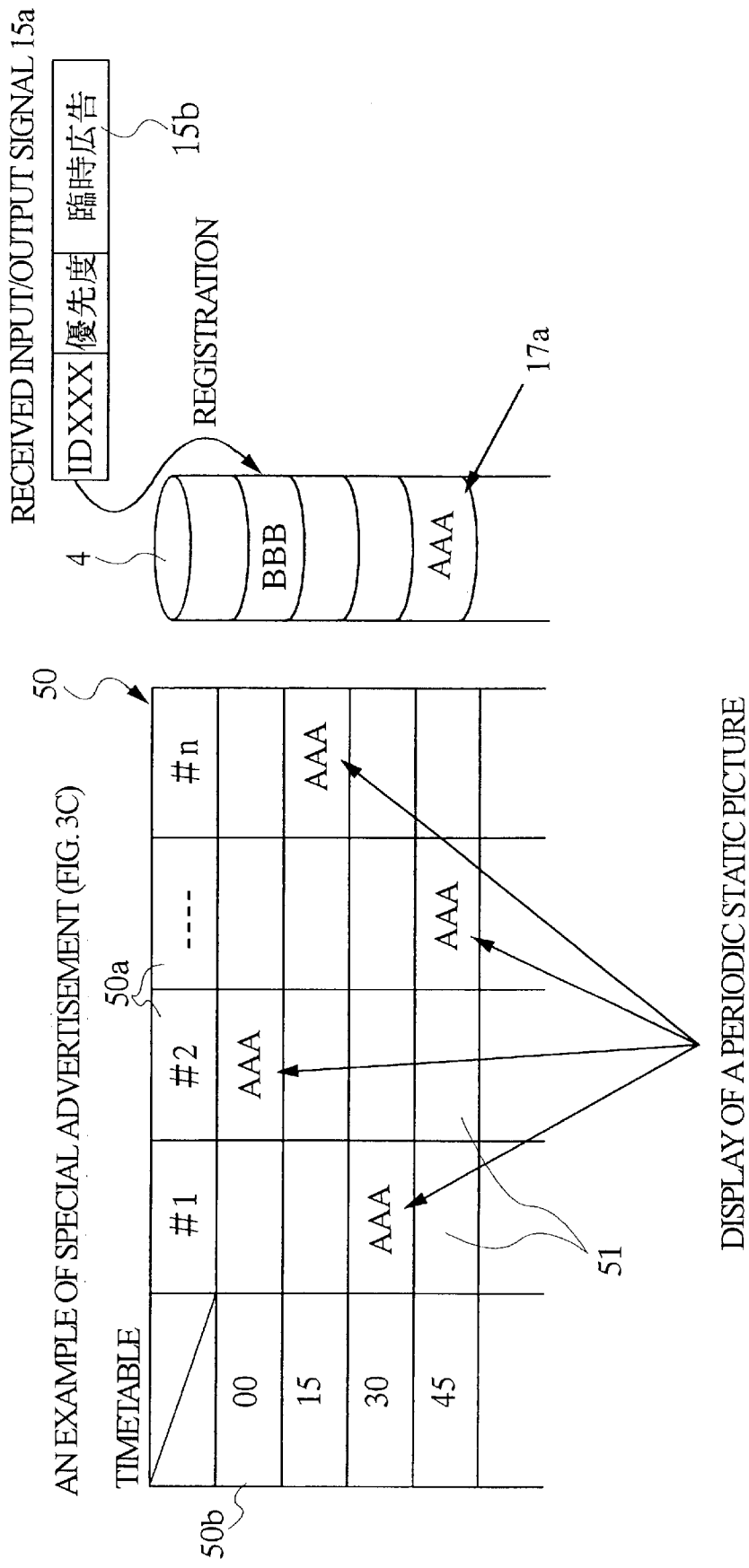
FIG. 9 is a diagram representing another control mode of the apparatus for information display according to an embodiment of the invention.

FIG. 3C and FIG. 9 show an example displayed by a train-transfer guidance (periodic information 17a) combined with the non-periodic information 15b, such as a special advertisement, which has been received via the transmitting/receiving circuit 11. The displaying of train-transfer guidance is on a periodic staic picture. The above-mentioned case will be described below.

In step E shown in FIG. 2, the control circuit 3 detects receipt of the instruction for "special advertisement" (the non-periodical information 15b) to be combined with the train-transfer guidance on a periodic static picture through the transmitting/receiving circuit 11. Then, the flow goes to step J. In step J, the control circuit 3 determines whether or not the non-periodic information 15b need to be displayed immediately (that is, the information 15b has level 2 in order of precedence). If NO, the flow goes to step K. In step K, the control circuit 3 (1) stores the screen data of "special advertisement" (non-periodic information 15b) received, in the information-storing section 4, and (2) changes the content (the composite flag 51c and composite content ID 51d of the entry 51 in the timetable 50, so that "special advertisement" (the non-periodic information 15b) may be combined with and displayed together with periodic guidance (periodic information 17a) on the static picture when the periodic guidance is displayed. Then, the control circuit 3 returns the waiting state.

Instead of the above-mentioned method, there is also another method for changing the composite flag 44 of the static picture guidance (periodic information 17a or the like stored in the information -storing section 4, and the composite content ID 45 for indicating content to be combined).

Then, the flow returns to step B after the above-mentioned performance. In step B, time comes to start the next time frame 50b in which the periodic guidance (the periodic information 17a) should be displayed on the static picture. The flow goes from step B to step G. In step G, in accordance with the altered timetable 50, the control circuit 3 (1) reads the screen data for the periodical guidance (the periodic information 17a), from the information-storing section 4, (2) selects the screen area, (3) stores in the screen area selected, screen data provide by combined the periodic guidance screen (the periodic information 17a and "the special advertisement" (the non-periodic information 15b) with each other, and (4) transmits the composite screen data to the corresponding display unit, thereafter displaying this composite screen data. Thus, it is possible to display the composite data shown in FIG. 3C. Although not shown in FIG. 2, in the same way, the non-periodic information 16b that corresponds to the external input signal 16a received via the input circuit 8 can be combined with and displayed together with the periodic information ha that accords with the timetable 50.

FIG. 9 is a diagram illustrating a control mode of updating the timetable 50 by performing the above-mentioned steps. The information-storing section 4 stores the content of the non-periodic information 15b that corresponds to the input signal 15a. Assume that the content of the non-periodic information 15b is a "special advertisement". In this case, the content of the periodic information 17a, which represents the train-transfer guidance combined on the periodic static picture, is already stored in the information-storing section 4. Display timing for the periodic information ha is already registered as content ID AAA in the timetable 50. Composite display combined by the screen data of the above-mentioned steps is accomplished by changing the composite flag 51c and composite content ID 51d of the entry 51, or by changing the composite content ID 45 and composite flag 44 of the periodic information 17a which is stored in the information-storing section 4 and which represents "train-transfer guidance" on the periodic static picture.

Figure 3D:
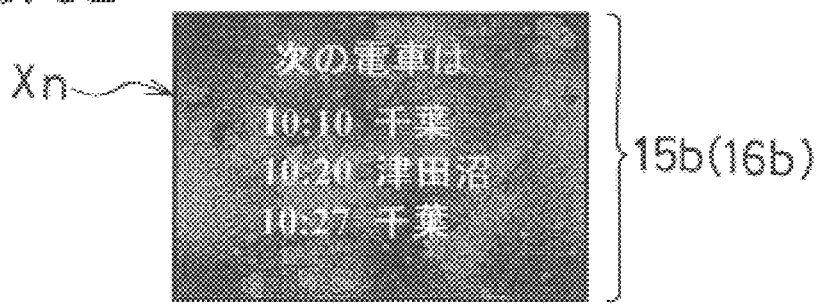
FIG. 3D is a diagram showing a screen displaying seasonal background, along with the apparatus for information display by an external input signal, in the apparatus for information display according to an embodiment of the invention.
Figure 10:
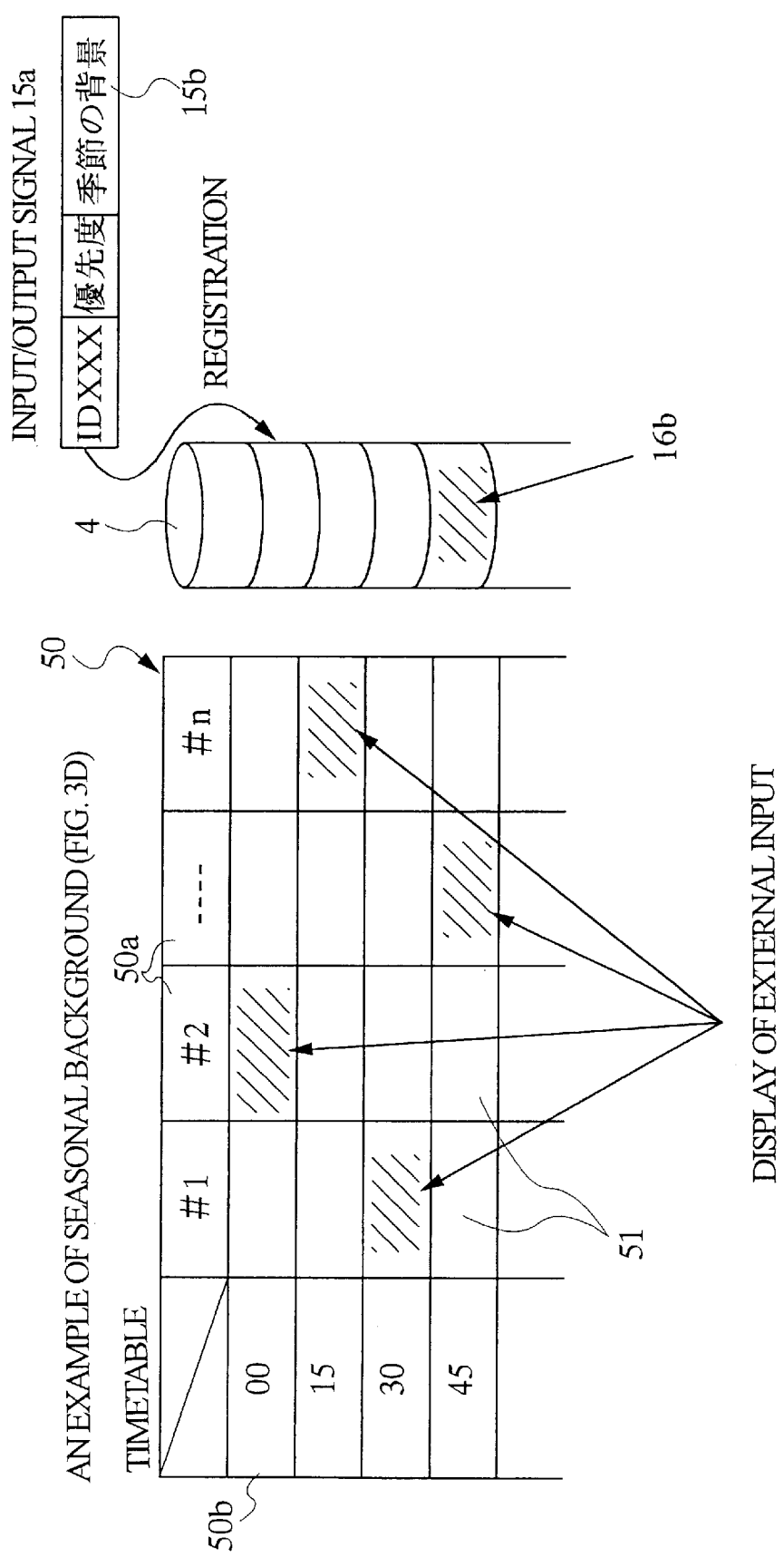
FIG. 10 is a diagram explaining another control mode of the apparatus for information display according to an embodiment of the invention.

FIG. 3D and FIG. 10 show an example displayed by "seasonal background" (the non-periodic information 15b) combined with the non-periodic information 16b corresponding to the external input signal 16a. "Seasonal background" is received through the transmitting/receiving circuit 11. The above-mentioned case will be described below.

In step E shown in FIG. 2, the control circuit 3 detects receipt of the instruction for "seasonal background" to be combined with an external input signal 16a though the transmitting/receiving circuit 11. Then, the flow goes to step J. In step J, the control circuit 3 determines whether or not "seasonal background" (non-periodic information 15b) need be displayed immediately (for example, order of precedence is level 2), the flow goes to step K. In step K, the control circuit 3 (1) stores the received screen data of "seasonal background" (non-periodic information 15b) in the information-storing section 4, and (2) changes the composite flag 44 and the content ID 45 (designating the "seasonal background", i.e., non-periodic information 15b) corresponding to the content of the non-periodic information 16b stored in the information-storing section 4, so that the "seasonal background" may be combined with and displayed together with the non-periodic information 16b corresponding to the external input signal 16a, when the non-periodic information 16b is displayed. Then, the control circuit 3 gets back the waiting state.

Thereafter, the flow goes through step D to step I. In step I, the control circuit 3 alters the timetable 50 so as to display the non-periodic information 16b corresponding to the external output signal 16a within the selected time frame 50b and to display seasonal background" (the non-periodic information 15b) after being combined with the information 16b. Thereafter, in step B, when starting time within the time frame 50b comes, the control circuit 3 displays the non-periodic information 16b corresponding to the external input signal 16a. The flow goes to step G. In step G, in accordance with the timetable 50 that has been thus altered, the display unit displays the screen data that combines of the "seasonal background" (non-periodic information 15b) and the non-periodic information 16b with each other. Thereby, the combined screen data shown in FIG. 3C can be displayed.

FIG. 10 is a diagram illustrating a control mode of updating the timetable 50 by performing the above-mentioned steps. The information-storing section 4 and the timetable 50 already store the non-periodic information 16b corresponding to the external input signal 16a. The non-periodic information 15b that represents "seasonal background" is stored in the information-storing section 4. Further, after being changed by the control circuit 3, the composite flag 44 and content ID 45 of the non-periodic information 16b are combined with and displayed together with the non-periodic information 15b.

Next, step F shown in FIG. 2 is a step for detecting an error process of the apparatus for information display according to an embodiment of the invention. If step F detects no error process, the control circuit 3 is brought back into the waiting state again. If step F detects an error process, the flow goes to step M. In step M, the control circuit 3 transmits an error message (the input signal 15b) via the transmitting/receiving circuit 11 to a remote place, so that the cause of the error process may soon be eliminated. Thereafter, the control circuit 3 gets back the waiting state again.

Figure 4:
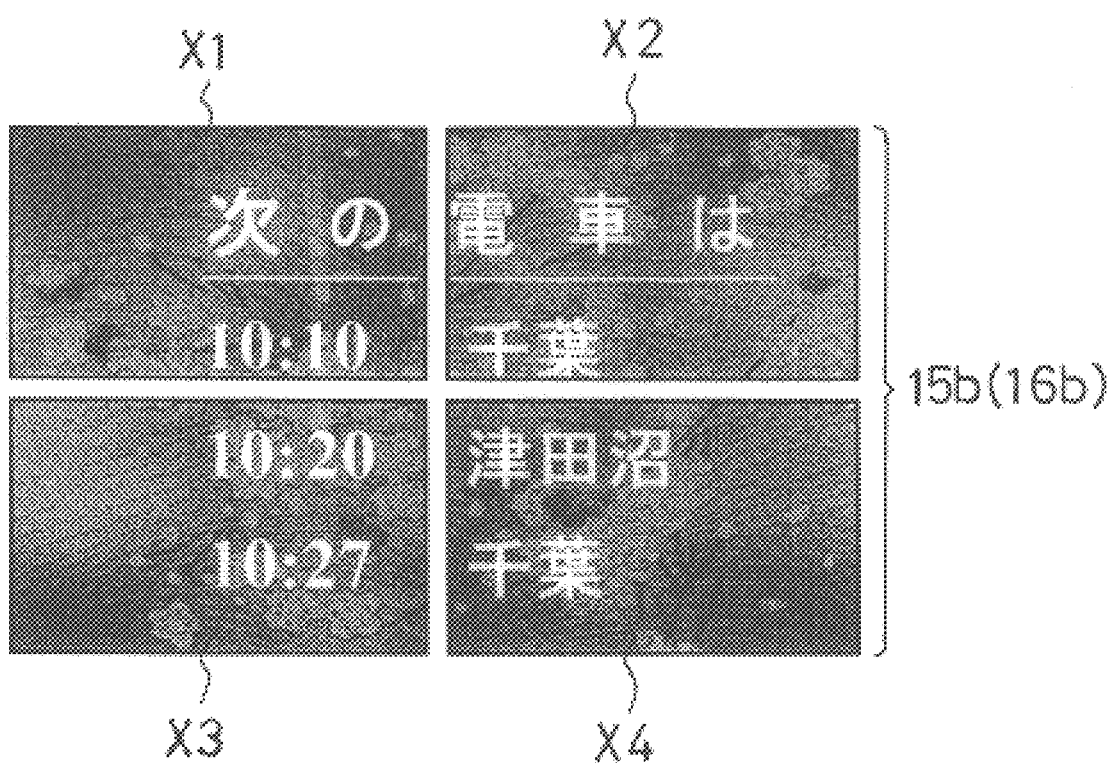
FIG. 4 is a diagram depicting four screens displaying information in the apparatus for information display according to an embodiment of the invention.

Thus far, in the present invention, a case where one display unit displays one screen is described. However, it is possible to divide one screen into a plurality of regularly arranged parts (e.g., four parts arranged in two rows and two columns), whereby to display all parts as a wider screen, respectively, on a plurality of display units. FIG. 4 shows the screens of four display units X1 to X4 divided for displaying one magnified screen data.

As has been described, the apparatus for information display according to an embodiment of the invention not only displays a desired periodic data 17a in a desired time frame 50*b* on a desired screen in accordance with the schedule, but also can display non-periodic information 15*b* and 16*b* that have not been reserved and can display combined screen data consisting of the periodic information 17*a* and the non-periodic information 15*b* or 16*b*. Thus, the apparatus for information display displays various data at desired times in accordance with the precedence of each data, enhancing the convenience and safety for the passengers and passersby who see and hear the data displayed.

Since the non-periodic information 15*b* and 16*b* are transmitted to the apparatus for information display from external devices, it is possible for the external devices to update, in real time, the non-periodic information 15*b* and 16*b* to be displayed.

Further, data, such as an error message indicating that the apparatus for information display has made an error, can be transmitted via the transmitting/receiving circuit 11 to a remote place. Hence, the error can be soon diagnosed and eliminated at the remote place.

The present invention made of the inventor has been described in detail, with reference to the preferred embodiments. Nevertheless, the invention is not limited to the embodiments. Needless to say, various changes can be made without departing the spirit and scope of the invention.

For example, order of precedence between a periodic information and a non-periodic information may be depended on the precedence assigned to the hardware ports through which the data are input and output, respectively.

The apparatus for information display according to the present invention can display various kinds of data in various forms, said data including those which accord with schedule and those which have been generated regardless of the schedule. This is an advantage of the present invention.

Moreover, the apparatus for information display can display not only data that accord with schedule, but also data generated regardless of the schedule. The apparatus for information display, therefore, serves to enhance the convenience and safety for the passengers and passersby who see and hear the data displayed. This is another advantage of the present invention.

What is clamed is:

1. An apparatus for information display comprising:

an information-storing section for storing schedule information and at least one of first display information and second display information, the schedule information designating an order and a time frame for displaying schedule items, the first display information being displaying according to the schedule information, the second display information being displayed according to information other than the schedule information;

an interface section for receiving an input signal which contains at least one of the second display information and information that designates a mode of displaying the second display information from an external source;

screen combining means for combining the first and second display information; and display control means for controlling a visual display of the first display information in an order and a time frame according to the schedule relative to a time clock on one or more screens, and while the first display information is displayed on one or more screens, selecting the second display information for a visual display on one or more different screens when the input signal is applied from said interface section.

2. An apparatus for information display comprising:

a multi-screen display device for providing a plurality of independent screens;

an information-storing section for storing schedule information and at least one of first display information and second display information, the schedule information designating an order and a time frame for displaying schedule items, the first display information being displaying according to the schedule information, the second display information being displayed according to information other than the schedule information;

an interface section for receiving an input signal which contains at least one of the second display information and information that designates a mode of displaying the second display information from an external source;

division display means for dividing and displaying at least one of the first and second display information on the screens of the multi-screen display device; and display control means for displaying the second display information on one or more screens of the multi-screen display device when the input signal is applied from said interface section, while the first display information is displayed in an order and a time frame according to the schedule information from said information-storing section relative to a time clock.

3. An apparatus for information display according to claim 2, further comprising screen-combining means for combining the first display information and the second display information for a visual display on at least one of the screens of the multi-screen display device.

4. An apparatus for information display according to claim 2, wherein said display control means begins to display the second display information from a time when the first display information being displayed is switched at first.

5. An apparatus for information display according to claim 4, wherein said information-storing section stores display information containing precedence for designating priority of interruption and switch of displaying information on the screens, and said display control means compares, in the precedence, display information displayed with the second display information corresponding to the input signal when receiving the input signal, and begins displaying the latter information after finishing displaying the former information when the former is higher than the latter in the precedence, and begins displaying the latter immediately when the former is lower than the latter in the precedence.

6. An apparatus for information display according to claim 2, wherein said information-storing section stores display information containing precedence for designating propriety of interruption and switch of displaying information on the screens, and said display control means compares, in the precedence, display information being displayed with the second display information corresponding to the input signal for each of the screens of the multi-screen display device when receiving the input signal, and displays the latter information on each of the screens set so as to make the former information lower than the latter information in the precedence.

7. An apparatus for information display according to claim 1, wherein the schedule information contains a composite flag for determining whether a screen of display information is combined with other screen, and a composite content ID for indicating an object being combined on occasion of a composite possibility, and said information-storing section stores the schedule information, the first display information, and the second display information, and said display control means refer to the composite flag and the composite content ID, thereby combining both screens together.

8. An apparatus for information display according to claim 3, wherein the schedule information contains a composite flag for determining whether a screen of display information is combined with other screen, and a composite content ID for indicating an object being combined on occasion of a composite possibility, and said information-storing section stores the schedule information, the first display information, and the second display information, and said display control means refer to the composite flag and the composite content ID, thereby combining both screens together.

9. A method for displaying information, comprising the steps of:

storing, into an information-storing section, schedule information and at least one of first display information and second display information, the schedule information designating an order and a time frame for displaying schedule items, the first display information being displaying according to the schedule information, the second display information being displayed according to information other than the schedule information;

receiving an input signal which contains at least one of the second display information and information that designates a mode of displaying the second display information from an external source;

displaying at least one of the first display information and the second display information on one or more screens;

while the first display information is displayed on one or more screens in an order and time frame according to the schedule information relative to a time clock, selecting the first display information and the second display information and displaying the second display information when the input signal is received from an external source which contains at least one of the second display information and information that designates a mode of displaying the second display information; and displaying a screen combined by the first display information and the second display information.

10. A method for displaying information in a multi-screen display device for displaying a plurality of independent screens, comprising the steps of:

storing, in an information-storing section, schedule information and at least one of first display information and second display information, the schedule information designating an order and a time frame for displaying schedule items, the first display information being displaying according to the schedule information, the second display information being displayed according to information other than the schedule information;

displaying the first display information on at least one of the screens of the multi-screen display device in an order and a time frame according to the schedule information relative to a time clock; and while the first display information is displayed on at least one of the screens of the multi-screen display device in an order and a time frame according to the schedule information relative to the time clock, displaying the second display information on at least one of the other screens of the multi-screen display device, when an input signal is received from an external source which contains at least one of the second display information and information that designates a mode of displaying the second display information.

11. A method for displaying information according to claim 10, further combining the first and second display information for a visual display on one or more screens of the multi-screen display device.

12. A method for displaying information according to claim 10, further beginning to display the second display information from a time when the first display information being displayed is switched at first.

13. A method for displaying information according to claim 12, further comprising:

storing, in the information-storing section, display information containing precedence for designating priority of interruption and switch of displaying information on the screens;

comparing, in the precedence, display information being now displayed with the second display information corresponding to the input signal when receiving the input signal;

beginning displaying the latter information after finishing displaying the former information when the former is higher than the latter in the precedence; and beginning displaying the latter immediately when the former is lower than the latter in the precedence.

14. A method for displaying information according to claim 10, further comprising:

storing, into the information-storing section, display information containing precedence for designating propriety of interruption and switch of displaying information on the screens;

comparing, in the precedence, display information being displayed with the second display information corresponding to the input signal for each of the screens of the multi-screen display device when receiving the input signal; and displaying the latter information on each of the screens set so as to make the former information lower than the latter information in the precedence.

15. A method for displaying information according to claim 9, further comprising:

storing, in the information-storing section, the first display information, the second display information, and the schedule information which contains a composite flag for determining whether a screen of display information is combined with other screen, and a composite content ID for indicating an object being combined on occasion of a composite possibility;

referring to the composite flag and the composite content ID; and combining both screens together.

16. A method for displaying information according to claim 11, further comprising:

storing, in the information-storing section, the first display information, the second display information, and the schedule information which contains a composite flag for determining whether a screen of display information is combined with other screen, and a composite content ID for indicating an object being combined on occasion of a composite possibility;

referring to the composite flag and the composite content ID; and combining both screens together.

17. An apparatus for information display according to claim 1, wherein the first display information is periodic information including static or dynamic images scheduled for display in an order and time designated according to the schedule information, and the second display information is non-periodic information received from the external source for display not in any order and time designated according to the schedule information without interrupting the visual display of the periodic information.

18. An apparatus for information display according to claim 2, wherein the first display information is periodic information including static or dynamic images scheduled for display in an order and time designated according to the schedule information, and the second display information is non-periodic information received from the external source for display not in any order and time designated according to the schedule information without interrupting the visual display of the periodic information.

19. A method for displaying information according to claim 9, wherein the first display information is periodic information including static or dynamic images scheduled for display in an order and time designated according to the schedule information, and the second display inflation is non-periodic information received from the external source for display not in any order and time designated according to the schedule information without interrupting the visual display of the periodic information.

20. A method for displaying information according to claim 10, wherein the first display information is periodic information including static or dynamic images scheduled for display in an order and time designated according to the schedule inflation, and the second display information is non-periodic information received from the external source for display not in any order and time designated according to the schedule information without interrupting the visual display of the periodic information.

* * * * *